(12) United States Patent
Umeda et al.

(10) Patent No.: US 7,696,659 B2
(45) Date of Patent: Apr. 13, 2010

(54) ALTERNATOR FOR VEHICLE

(75) Inventors: Atsushi Umeda, Okazaki (JP); Kouichi Ihata, Okazaki (JP); Nobuo Isogai, Kariya (JP)

(73) Assignee: Denso Corporation, Kariya (JP)

( * ) Notice: Subject to any disclaimer, the term of this patent is extended or adjusted under 35 U.S.C. 154(b) by 208 days.

(21) Appl. No.: 11/806,611

(22) Filed: Jun. 1, 2007

(65) Prior Publication Data
US 2008/0048533 A1 Feb. 28, 2008

(30) Foreign Application Priority Data
Aug. 22, 2006 (JP) ............................. 2006-224798

(51) Int. Cl.
*H02K 11/00* (2006.01)
(52) U.S. Cl. .................................................. 310/68 D
(58) Field of Classification Search .............. 310/68 D, 310/71, 89
See application file for complete search history.

(56) References Cited

U.S. PATENT DOCUMENTS

| | | |
|---|---|---|
| 5,936,326 A | 8/1999 | Umeda et al. |
| 5,952,749 A | 9/1999 | Umeda et al. |
| 5,955,810 A | 9/1999 | Umeda et al. |
| 5,965,965 A | 10/1999 | Umeda et al. |
| 5,982,068 A | 11/1999 | Umeda et al. |
| 5,986,375 A | 11/1999 | Umeda et al. |
| 5,994,813 A | 11/1999 | Umeda et al. |
| 5,998,903 A | 12/1999 | Umeda et al. |
| 6,011,332 A | 1/2000 | Umeda et al. |
| 6,051,906 A | 4/2000 | Umeda et al. |
| 6,097,130 A | 8/2000 | Umeda et al. |
| 6,124,660 A | 9/2000 | Umeda et al. |
| 6,137,201 A | 10/2000 | Umeda et al. |
| 6,144,136 A | 11/2000 | Umeda et al. |
| 6,181,043 B1 | 1/2001 | Kusase et al. |
| 6,181,045 B1 | 1/2001 | Umeda et al. |
| 6,198,190 B1 | 3/2001 | Umeda et al. |
| 6,291,918 B1 | 9/2001 | Umeda et al. |
| 6,459,186 B1 | 10/2002 | Umeda et al. |
| 6,787,952 B2 * | 9/2004 | Asao .................... 310/68 D |
| 6,867,517 B2 * | 3/2005 | Kumagai ............... 310/68 D |
| 7,397,157 B2 * | 7/2008 | Maekawa et al. .......... 310/114 |

FOREIGN PATENT DOCUMENTS

| | | |
|---|---|---|
| JP | A 5-199707 | 8/1993 |
| JP | A 11-155270 | 6/1999 |

* cited by examiner

*Primary Examiner*—Nguyen N Hanh
(74) *Attorney, Agent, or Firm*—Oliff & Berridge, PLC

(57) ABSTRACT

An alternator for a vehicle has a rotor with a field wiring, a stator with a three-phase stator wiring, a regulator, and a rectifier. The regulator and rectifier are disposed away from each other with the rotor between. An alternating current is generated in the stator wiring in response to a rotation of the rotor and a field current received in the field wiring. The rectifier converts the alternating current into a direct current and outputs the direct current as an electrical energy generated in the alternator. The regulator regulates a value of the filed current to control the electrical energy. The rectifier acts as a heat generating member, but heat generated in the rectifier is hardly transmitted to the regulator disposed away from the rectifier.

18 Claims, 8 Drawing Sheets

FRONT SIDE ← → REAR SIDE

ALTERNATOR FOR VEHICLE

CROSS-REFERENCE TO RELATED APPLICATION

This application is based upon and claims the benefit of priority of the prior Japanese Patent Application 2006-224798 filed on Aug. 22, 2006 so that the contents of which are incorporated herein by reference.

BACKGROUND OF THE INVENTION

1. Field of the Invention

The present invention relates to an alternator driven by an internal combustion engine of a vehicle such as a passenger car, a truck or the like.

2. Description of Related Art

A slant nose type vehicle has recently been required to decrease a running resistance in the vehicle and to improve a field of vision for a driver. Further, a wide accommodation space of a vehicle compartment has recently been required to give better comfort to occupants of the vehicle. These requirements narrow an engine room space. In the engine room, an internal combustion engine, an alternator driven by the engine, and the like are disposed.

Further, an engine speed has been reduced to improve fuel economy, so that number of revolutions in an alternator has been reduced. In contrast, the number of current consumers such as a safety control device and the like has been increased, so that the alternator has been required to increase its generated electrical energy. Therefore, the alternator having a smaller size and a higher output is required. In this alternator, combustion heat per unit volume is heightened, and cooling performance is inevitably lowered.

In an alternator for a vehicle, a columnar rotor is disposed in a cylindrical stator, a pulley is disposed on a driving side of the rotor to receive a rotational force from an engine, and the rotor is rotated on its axis in response to the rotational force. In response to the rotation of the rotor and a field current supplied to the rotor, an alternating current is generated in a stator wiring of the stator. A generator voltage regulator adjusts a voltage of this current by regulating the field current. A rectifier rectifies the alternating current. The rectified current set at the adjusted voltage is output to electric consumers and a battery of the vehicle. Electronic devices such as the regulator and rectifier are disposed on an anti-driving side of the rotor opposite to the driving side. That is, the pulley and the group of electronic devices are disposed away from each other with the rotor between.

Because the current is generated in the stator wiring, this wiring acts as a heat generating member. However, because the cooling performance of the alternator has recently been lowered, constitutional members of the alternator are inevitably heated by the stator wiring at high temperatures. Therefore, there is a probability that the members be heated so as to exceed those allowable temperatures and be broken.

To prevent the members from being excessively heated by the stator wiring, Published Japanese Patent First Publication No. H11-155270 has disclosed an alternator wherein a space factor indicating a space ratio of the stator wiring to an allowable space for the wiring is heightened to reduce electric resistance of the wiring to a half level. However, the rectifier is generally made of diodes connected with one another in a diode bridge, so that the rectifier also acts as a heat generating member. Therefore, a problem based on heat generated by the rectifier is not solved in this Publication.

In recent years, the alternator has been required to further increase its output power. Therefore, the rectifier and regulator disposed on the anti-driving side of the rotor are easily heated so as to exceed those allowable temperatures, and the rectifier and regulator are sometimes broken. Particularly, the regulator is an electronic circuit member for controlling the generated current of the alternator. Therefore, even though the regulator does not break easily, malfunctions can easily occur in the regulator. In this case, the battery is excessively charged so as to shorten the life of the battery. To prevent the malfunction of the regulator, a heat dissipating fin attached to the regulator has been modified to improve heat dissipation of the regulator. However, heat cannot be sufficiently dissipated from the regulator.

Further, in another publication, a temperature sensor is attached to a regulator. When the sensor detects that the regulator is heated at a predetermined temperature, the alternator stops generating an electrical energy. However, a manufacturing cost of the alternator is heightened due to the sensor and a control system for stopping the energy generation. Further, it is difficult to reliably operate the sensor. In addition, when the operation of the alternator is stopped often, the battery cannot be sufficiently charged.

Moreover, high temperature members such as an exhaust manifold of an engine are often disposed on a rear side of an alternator (i.e., anti-driving side of rotor) so as to be close to a regulator. In this case, the regulator is further heated.

Furthermore, Published Japanese Patent First Publication No. H05-199707 has disclosed an alternator wherein both a regulator and a rectifier are disposed on a front side of an alternator (i.e., driving side of rotor). However, the regulator still receives heat from the rectifier, and the heat cannot be sufficiently dissipated from the regulator.

SUMMARY OF THE INVENTION

An object of the present invention is to provide, with due consideration to the drawbacks of the conventional alternator, an alternator which generates a high electrical energy at a low cost in a small size while suppressing a temperature rise of a regulator.

According to an aspect of this invention, the object is achieved by the provision of an alternator comprising a rotor with a field wiring receiving a field current, a stator with a multi-phase stator wiring, a rectifier, and a regulator. The regulator and the rectifier are disposed away from each other with the rotor between.

With this structure of the alternator, an alternating current is generated in the stator wiring in response to a rotation of the rotor and the field current received in the field wiring. The rectifier converts the alternating current of the stator wiring into a direct current and outputs the direct current as an electrical energy generated in the alternator. The regulator regulates the filed current to control the electrical energy. During the operation of the alternator, the rectifier acts as a heat generating member. Because the rectifier and regulator are disposed away from each other with the rotor between, heat generated in the rectifier is hardly transmitted to the regulator.

Accordingly, even though the alternator is manufactured in a small size, the alternator can generate a high electrical energy at a low cost while suppressing a temperature rise of the regulator. In this case, the malfunction of the regulator can be prevented, and the regulator can be reliably operated.

Further, in a prior art case where the rectifier and regulator are disposed on the same side of the rotor, the rectifier and regulator are disposed together in a limited space. Therefore, the rectifier cannot occupy a wide space sufficient to dissipate heat generated in the rectifier. However, in the present invention, because the rectifier and regulator are disposed away from each other with the rotor between, a space for the rectifier can be enlarged without being disturbed by the regulator. In this case, the rectifier can have a large heat radiation fin. Therefore, heat generated in the rectifier can be efficiently dissipated through the fin. Further, the fin can be formed in a disk shape so as to symmetrically dispose rectifying elements of the rectifier with respect to the center of the fin. Accordingly, this symmetrical arrangement prevents a part of the rectifying elements from being heated to a high temperature.

DETAILED DESCRIPTION OF THE PREFERRED EMBODIMENTS

Figure 1:
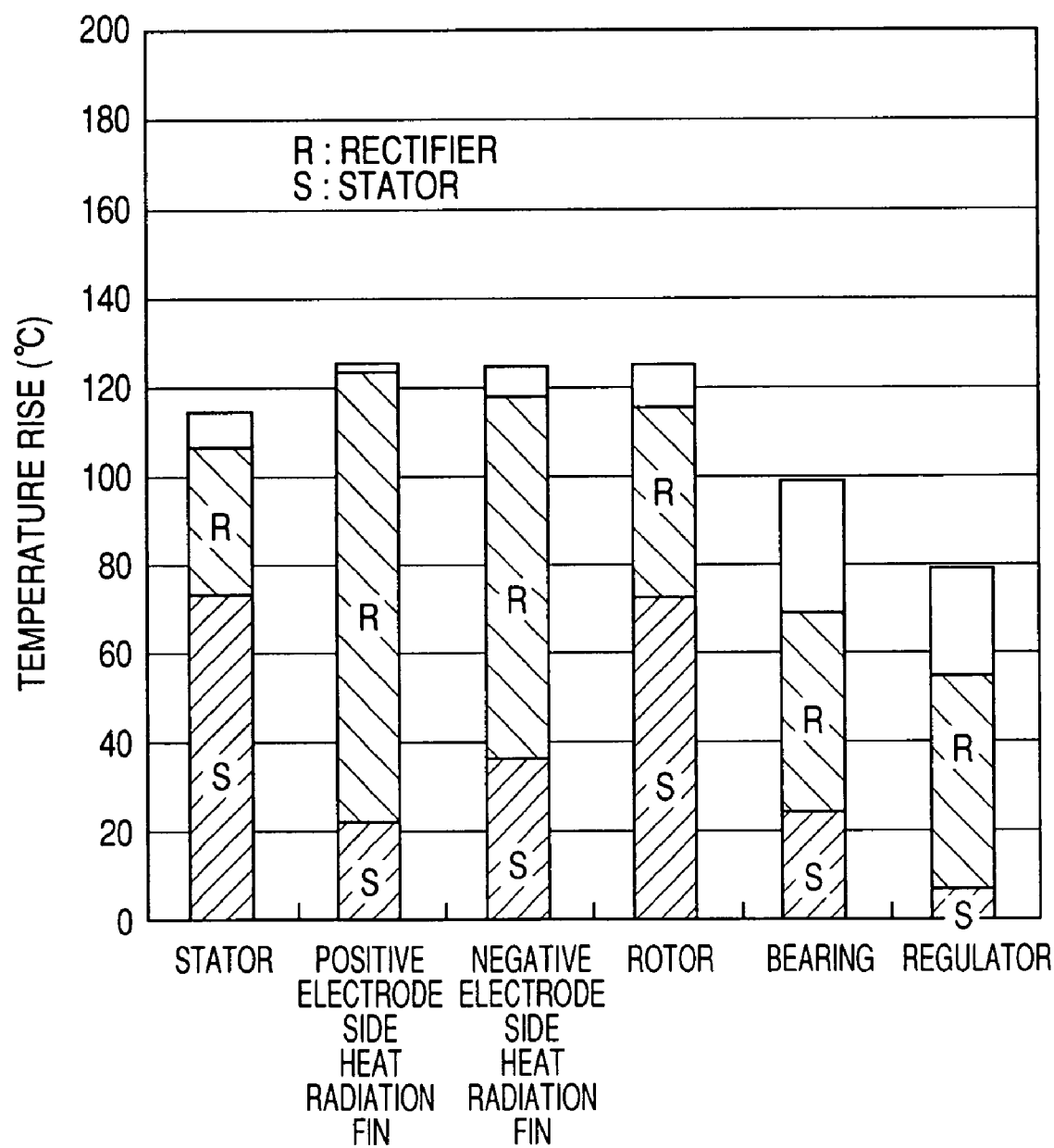
FIG. 1 is a view showing results of a temperature analysis which indicates a temperature rise in each constitutional member of an alternator caused by heat generated in both a stator and a rectifier of the alternator.

Embodiments of the present invention will now be described with reference to the accompanying drawings, in which like reference numerals indicate like parts, members or elements throughout the specification unless otherwise indicated.

The inventors of this application have analyzed temperature rises in constitutional members of an alternator and realized that a temperature rise in a regulator of the alternator was mainly caused by heat generated in a rectifier of the alternator.

FIG. 1 is a view showing results of the temperature analysis of the inventors. In FIG. 1, a sign "S" in each of constitutional members of an alternator indicates a temperature rise of the member caused by a stator of the alternator, and a sign "R" in each constitutional member indicates a temperature rise of the member caused by a rectifier of the alternator. As shown in FIG. 1, temperature rises in a stator, a positive electrode side heat radiation fin of a rectifier connected with a positive electrode of a battery, a negative electrode side heat radiation fin of the rectifier connected with a negative electrode of the battery, a rotor, a bearing, and a regulator are analyzed. As a result of this temperature analysis, a temperature rise of the regulator is almost caused by heat generated in the rectifier. More specifically, among heat corresponding to the whole temperature rise of almost 80° C. in the regulator, the regulator receives heat corresponding to a temperature rise of almost 50° C. from the rectifier. Therefore, there is a probability that a malfunction could occur in the regulator due to heat mainly generated in the rectifier. In alternators according to embodiments of the present invention, the inventors intend to reduce a heat flow from the rectifier to the regulator.

Embodiment 1

Figure 2:
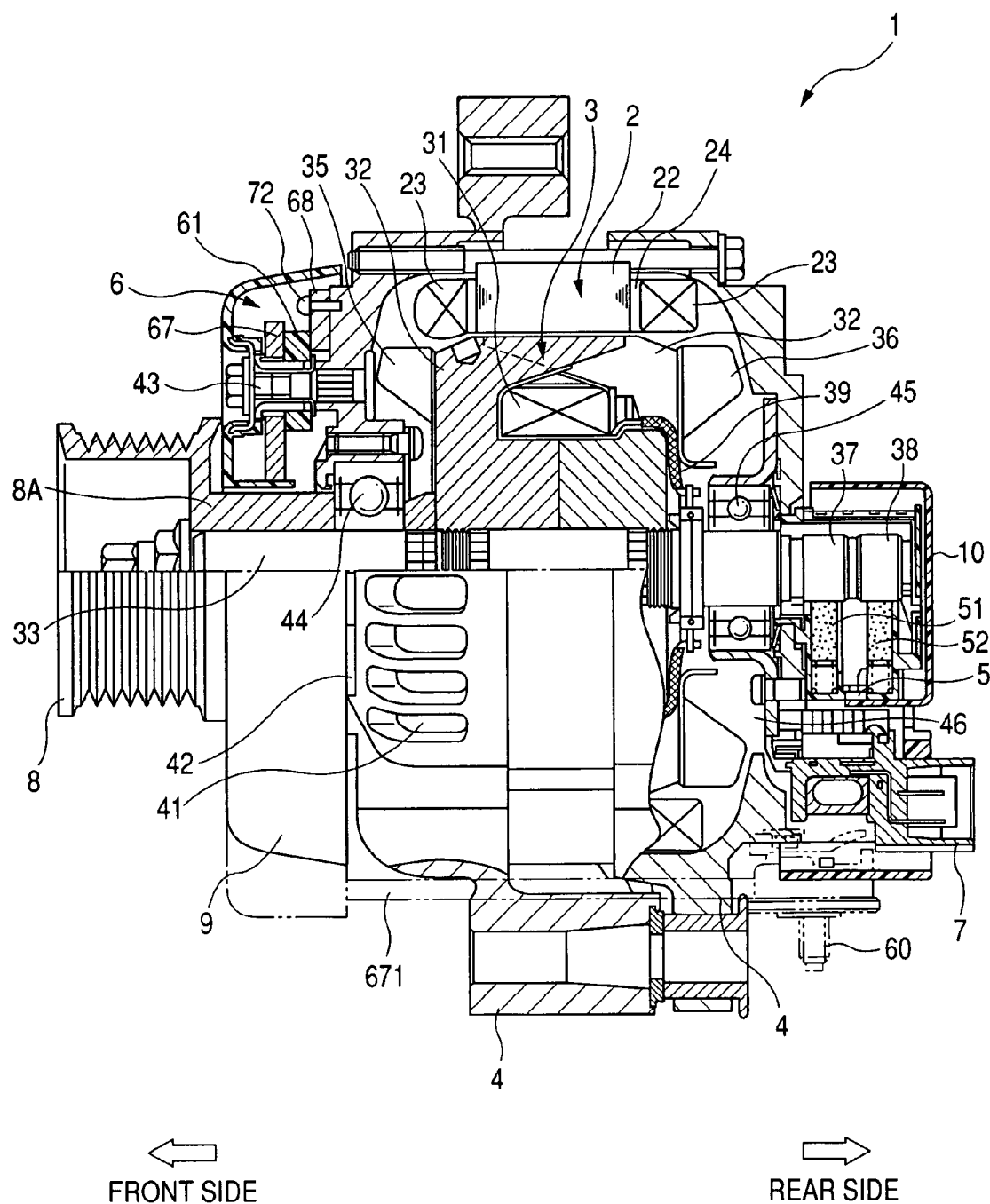
FIG. 2 is a longitudinal sectional view of an alternator according to a first embodiment of the present invention.

FIG. 2 is a longitudinal sectional view of an alternator used for a vehicle according to this embodiment. As shown in FIG. 2, an alternator 1 has a cylindrical stator 2, a columnar rotor 3 disposed in a center hole of the stator 2 at a predetermined interval from the stator 2, a frame 4 with which an outer circumferential surface of the stator 2 is covered and which supports the stator 2 and rotor 3, a brush device 5 fixed to a rear portion of the frame 4 on a rear side of the alternator 1, a rectifier 6 fixed to a front portion of the frame 4 on a front side of the alternator 1, a regulator 7 fixed to the rear portion of the frame 4 on the rear side of the alternator 1 so as to be far away from the rectifier 6, a pulley 8 fixed to the rotor 3 on the front side of the alternator 1, a front cover 9 with which the rectifier 6 is covered, and a rear cover 10 with which the brush device 5 and regulator 7 are covered.

The stator 2 has a stator core 22, a multi-phase (e.g., three-phase) stator wiring 23 wound around the core 22, and an insulator 24 electrically insulating the wiring 23 from the core 22. The wiring 23 has three phase wirings connected with one another in Y-connection.

The rotor 3 has a rotational shaft 33, a pair of pole cores 32 fixed to the shaft 33 so as to place the shaft 33 in a center hole of the core 32, and a field wiring 31 wound around the core 32 cylindrically and coaxially. The cores 32 have a plurality of nail portions aligned along a circumferential direction of the core 32. The wiring 31 is formed of a cupper wire covered with insulator or resin.

The frame 4 supports the stator 2 and rotor 3 accommodated therein. The frame 4 has a bearing unit 44 disposed on the front side and a bearing unit 45 disposed on the rear side. The units 44 and 45 of frame 4 rotatatively support front and rear portions of the shaft 33, respectively. The frame 4 has a plurality of inlet windows 42 and a plurality-of outlet windows 41. The windows 41 are disposed along the circumferential direction so as to face the wiring 23 protruded from the core 22 in an axial direction of the shaft 33.

A cooling fan 35 is attached, by welding or the like, to a front end surface of one pole core 32 placed on the front side. The fan 35 receives a cooling wind through the windows 42, moves the wind along the axial direction and radial directions of the rotor 3, and discharges the wind through the windows 41. The wind from the fan 35 cools the rotor 3 and the stator 2. A cooling fan 36 is attached, by welding or the like, to a rear end surface of the other pole core 32 placed on the rear side. The fan 36 receives a cooling wind through windows (not shown) of the rear cover 10 and an open space 46, moves the wind along the axial direction, and discharges the wind through the windows 41. The wind from the fan 36 cools the rotor 3.

The pulley 8 has a pulley shaft 8A, and a front end of the shaft 33 is fixedly inserted into the pulley shaft 8A. The pulley 8 receives a rotational force from an internal combustion engine of the vehicle and transmits this force to the shaft 33 to drive the rotor 3. Therefore, the pulley shaft 8A fitted to a front portion of the shaft 33 is placed on a driving side of the rotor 3.

Two slip rings 37 and 38 are attached to a rear portion of the shaft 33 opposite to the front portion of the shaft 33 so as to be rotated with the shaft 33. Therefore, the slip rings 37 and 38 are placed on an anti-driving side of the rotor 3 opposite to the driving side. Each of the slip rings 37 and 38 has two half portions, respectively, connected with both ends of the wiring 31 through conductor lines 39.

The brush device 5 is placed on the anti-driving side of the rotor 3. The brush device 5 has two brushes 51 and 52, respectively, pressing the rings 37 and 38. A field current is supplied from the rectifier 6 to the wiring 31 through the brush device 5 and the rings 37 and 38. A flow direction of the field current in the wiring 31 is changed every half rotation of the shaft 33, and a three-phase alternating current is generated in the stator wiring 23.

The rectifier 6 rectifies the alternating current of the wiring 23 to produce a rectified or direct current as an electrical energy generated in the alternator 1. This direct current is outputted from a B-bolt 60 disposed on the rear side of the actuator 1 through a B-bar 671. The rectifier 6 is fixed to the outer surface of the frame 4 by fastening stud bolts 43 protruded from a front portion of the frame 4 to the rectifier 6 with nuts. The rectifier 6 is disposed so as to surround the pulley shaft 8A along the circumferential direction and is placed on the same position as that of the pulley shaft 8A in the axial direction. Therefore, the rectifier 6 is positioned on the driving side of the rotor 3.

The regulator 7 is placed on the same position as that of the brush device 5 in the axial direction. Therefore, the regulator 7 is positioned on the anti-driving side of the rotor 3. The regulator 7 regulates a value of the field current supplied to the field coil 31 to control an electrical energy generated in the alternator 1. The regulator 7 is connected with a higher voltage end of the wiring 31 to prevent the alternator 1 from applying an electric potential to the wiring 31 when the alternator 1 is not operated. The regulator 7 has an earth terminal, a B terminal connected with the B-bolt 60, a P terminal through which an electric potential induced in the wiring 23 is monitored, and a terminal connected with the brush device 5.

With this configuration of the alternator 1, when a rotational force is transmitted from the engine to the shaft 33 through a belt and the pulley 8, the rotor 3 is rotated along a predetermined rotation direction. When a field current is supplied to the field wiring 31 of the rotated rotor 3 through the brush device 5, the nail portions of the rotated cores 32 are magnetized. Therefore, a three-phase alternating current is generated in the stator wiring 23. The regulator 7 adjusts the field current on the basis of a voltage of the battery to control the current of the wiring 23. The rectifier 6 rectifies the alternating current of the wiring 23 to obtain a direct current. This direct current is transmitted to the B-bolt 60 and is outputted to current consumers and a battery through an output cable of the vehicle. Further, a portion of the direct current is supplied to the regulator 7 through the B-bolt 60 as the field current. Therefore, because the regulator 7 controls the current of the wiring 23 on the basis of a voltage of the battery, the battery can be appropriately charged. In this embodiment, a rated output voltage of the battery is set at 12V.

Figure 3:
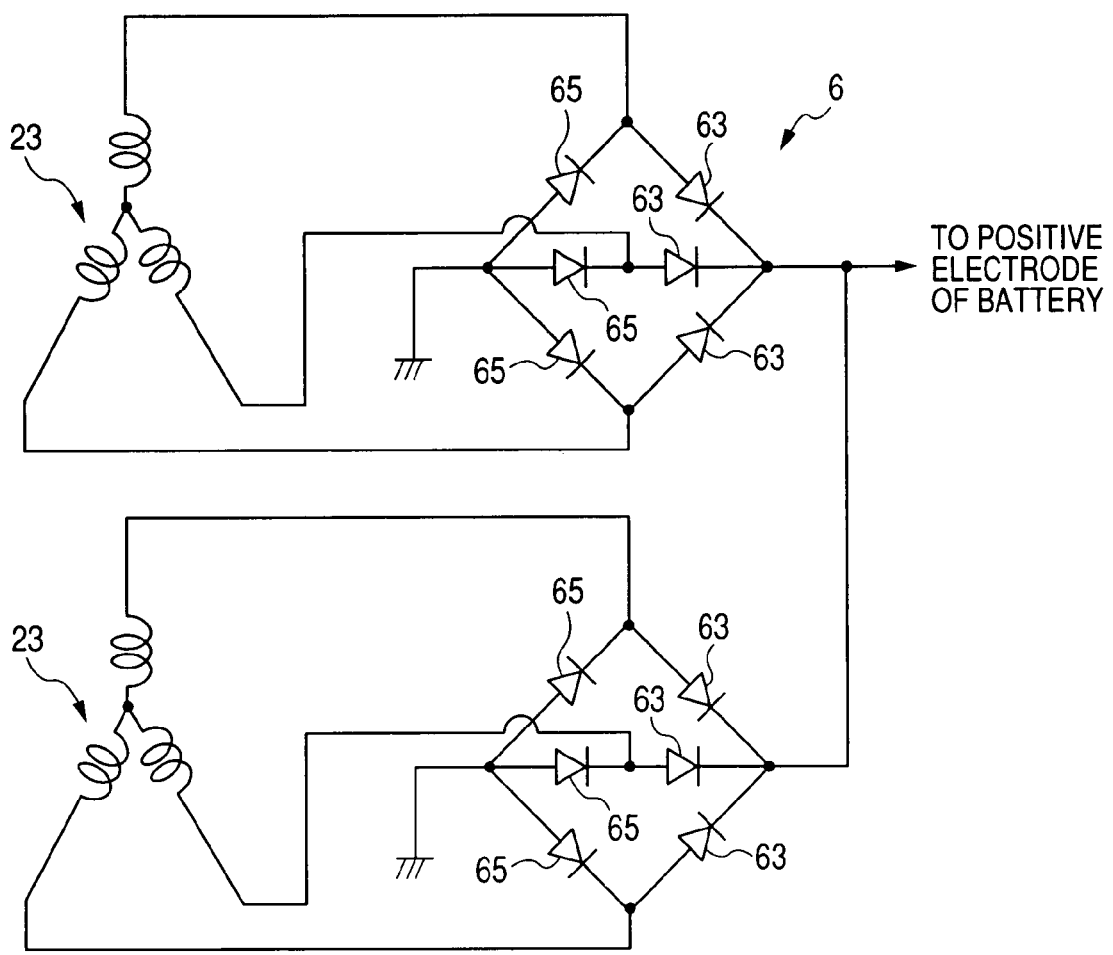
FIG. 3 is an electric circuit diagram of a rectifier shown in FIG. 2.
Figure 4:
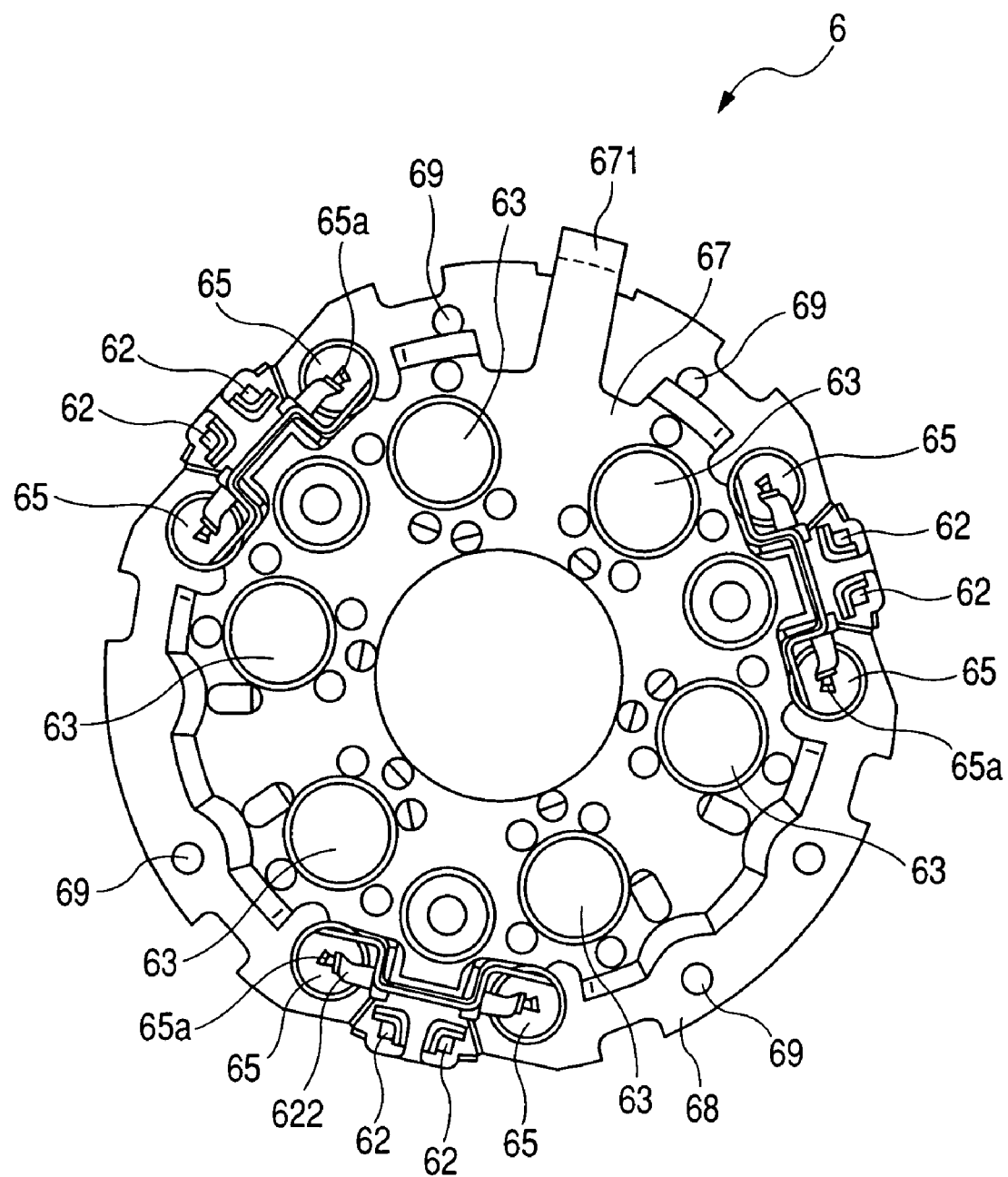
FIG. 4 is a front view of a rectifier seen from a front side of the alternator shown in FIG. 2.

Next, the rectifier 6 is described in detail with reference to FIG. 2 to FIG. 5. FIG. 3 is an electric circuit diagram of the rectifier 6. FIG. 4 is a front view of the rectifier 6 seen from the front side, while FIG. 5 is a back view of the rectifier 6 seen from the rear side.

As shown in FIG. 3, the rectifier 6 has two diode bridge circuits arranged in parallel to each other. Each diode bridge circuit has three positive electrode side rectifying elements (e.g., diodes) 63 of which cathodes are electrically connected with a positive electrode of the battery, and three negative electrode side rectifying elements (e.g., diodes) 65 of which anodes are earthed. Anodes of the rectifying elements 63 are connected with cathodes of the rectifying elements 65 at connection points, respectively. First ends of the U-, V- and W-phase wirings of the stator wiring 23 are connected with one another at a neutral point, and second ends of the phase wirings are connected with each diode bridge circuit at the connection points, respectively.

Figure 5:
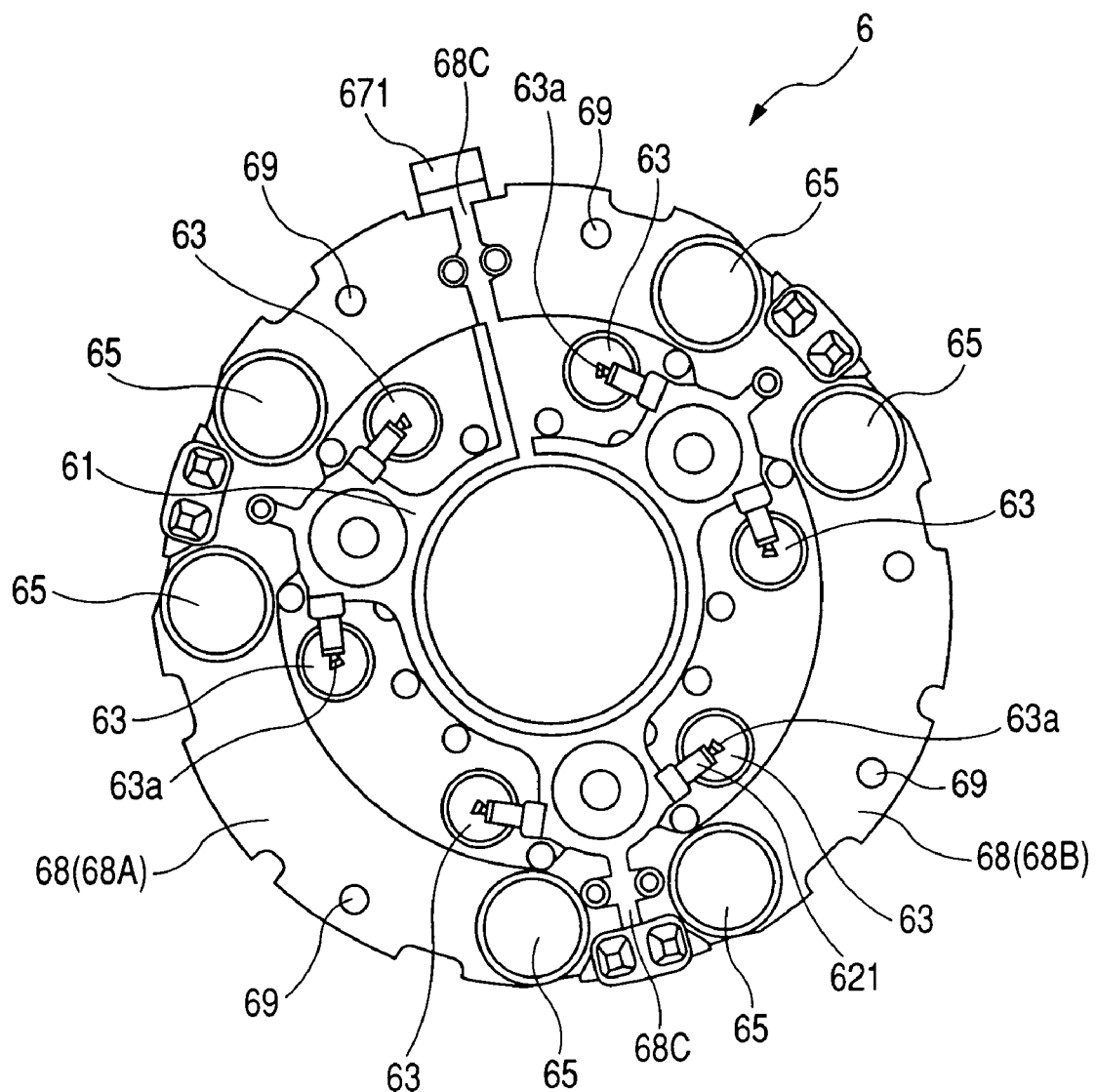
FIG. 5 is a back view of the rectifier seen from a rear side of the alternator shown in FIG. 2.

As shown in FIG. 2, FIG. 4 and FIG. 5, the rectifier 6 further has a terminal board 61 in which connection terminals 62 are embedded so as to be protruded from the terminal board 61, a first radiation fin 67 for holding the rectifying elements 63 and dissipating heat mainly generated in the elements 63, and a second radiation fin 68 for holding the rectifying elements 65 and dissipating heat mainly generated in the elements 65. The second ends of the phase wirings are connected with the connection terminals 62.

The fin 67 is formed in a smaller disk shape and has six through holes (or attaching holes) disposed at almost equal intervals along a circumferential direction of the fin 67. The fin 67 has a B-bar 671 with a cross-over line extending toward the anti-driving side. The cross-over line of the B-bar 671 is covered with an insulating material and is fitted to the B-bolt 60. The fin 68 is formed in a larger disk shape and has six through holes (or attaching holes). The fins 67 and 68 are coaxially disposed to be away from each other in the axial direction with the terminal board 61 between. Each of the fins 67 and 68 further has a center hole, and the pulley shaft 8A is inserted into the center holes of the fins 67 and 68.

The six rectifying elements 63 are forcibly inserted into the through holes of the fin 67 and are fixedly fitted to the fin 67, respectively. Lead wires 63a extending from the anodes of the rectifying elements 63 are disposed so as to face the frame 4 and are connected with connection ends 621 of the connection terminals 62 by TIG (tungsten inert gas) welding, respectively. Because the through holes of the fin 67 are disposed at almost equal intervals, the rectifying elements 63 can be symmetrically disposed in the fin 67 with respect to the center of the fin 67. The cathodes of the rectifying elements 63 are electrically connected with the fin 67. Therefore, an electric current output from the elements 63 is transmitted to the B-bolt 60 through the B-bar 671.

The six rectifying elements 65 are forcibly inserted into the through holes of the fin 68 and are fixedly fitted to the fin 68, respectively. Lead wires 65a extending from the cathodes of the rectifying elements 65 are disposed so as to face the front cover 9 and are connected with other connection ends 622 of the connection terminals 62 by TIG welding, respectively. Therefore, each rectifying element 63 is serially connected with the corresponding rectifying element 65 through one terminal 62. The anodes of the rectifying elements 65 are electrically connected with the fin 68, and the fin 68 is earthed.

The fin 68 has two thin-walled portions on which separation grooves 68C are, respectively, formed. The fin 68 is equally partitioned into two fin portions 68A and 68B facing each other through the grooves 68C. An area of the portion 68A is almost the same as that of the portion 68B. The three through holes of the fin portion 68A are placed symmetrically with those of the fin portion 68B with respect to a line passing through the grooves 68C. Each of the portions 68A and 68B has two fixing holes 69. A small screw 72 (see FIG. 2) inserted into each hole 69 is received in a screwed hole formed in the frame 4 and is fastened to the frame 4. Therefore, the fin 68 is fixed to the frame 4.

With this structure of the rectifier 6, because the regulator 7 and rectifier 6 are disposed away from each other with the rotor 3 between, thermal conduction between the regulator 7 and rectifier 6 can be substantially interrupted with the rotor 3. Therefore, a heat flow from the rectifier 6 to the regulator 7 is considerably reduced, so that influence of this heat flow on the regulator 7 is reduced. Accordingly, a temperature rise of the regulator 7 caused by heat generated in the rectifier 6 can be considerably reduced.

The inventors have examined a temperature rise of a regulator in a conventional alternator and a temperature rise of the regulator 7 according to this embodiment in the same operation conditions such as an engine speed, an atmospheric temperature, a generated electrical energy and the like. Examined results are shown in FIG. 6.

Figure 6:
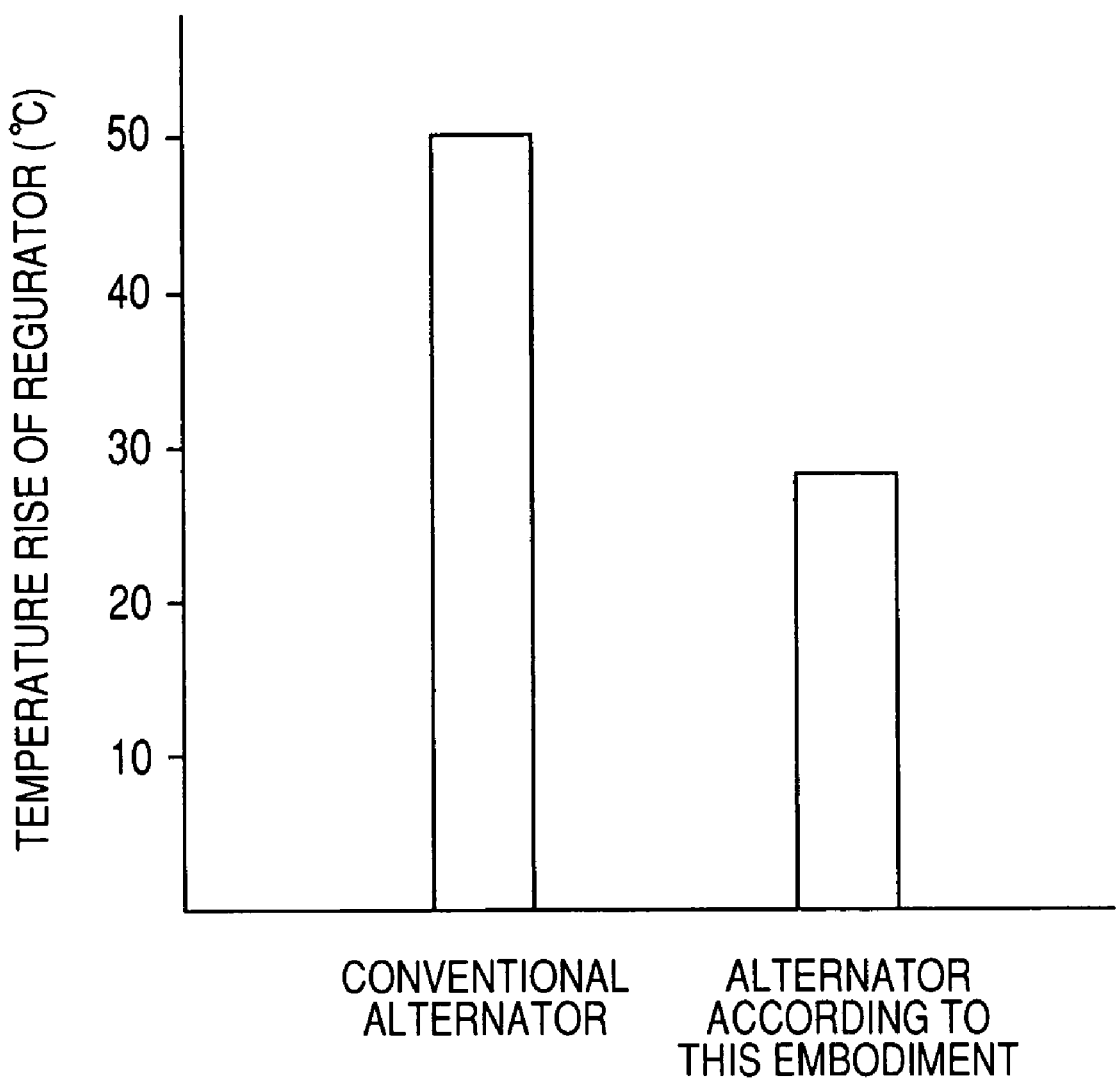
FIG. 6 is a view showing a temperature rise of a regulator according to the prior art and a temperature rise of a regulator according to the first embodiment.

As shown in FIG. 6, a temperature rise of the regulator 7 according to this embodiment is reduced by almost 20° C. as compared with that in the conventional alternator. Assuming that cooling fans attached to a rotor are enlarged in size to obtain the same effect on the reduction of the temperature rise in the regulator, a cooling noise caused by the rotation of the fans is increased, and a size of an alternator in the axial direction is enlarged. In contrast, when a regulator and a rectifier are disposed away from each other with a rotor between according to this embodiment, the alternator can generate a high electrical energy at a low cost in a small size while suppressing a temperature rise of the regulator and while preventing the increase of the cooling noise.

Further, the rectifier 6 is not disposed with the brush device 5 and the regulator 7 in a limited space on the anti-driving side, but is disposed in a wide space on the driving side without being disturbed by the regulator 7. Therefore, a space for disposing the fins 67 and 68 can be widened so as to enlarge heat dissipating areas of the fins 67 and 68. Accordingly, heat generated in the rectifying elements 63 and 65 can be efficiently dissipated through the large-sized fins 67 and 68, so that a temperature rise of the rectifier 6 caused by heat generated in the rectifier 6 itself can be considerably reduced.

Moreover, each fin can be formed in a disk shape extending perpendicular to the axial direction of the rotor 3 while placing the center of the fin at a position of the shaft 33. Accordingly, the rectifying elements can be symmetrically disposed in each fin with respect to the center of the fin or a line partitioning the fin into two portions, so that the rectifying elements of the rectifier 6 can be equally cooled.

Furthermore, the rectifier 6 is attached to the frame 4 on the front side of the frame 4, and the frame 4 is fixed to a vehicle body. Therefore, even though vibration occurs in the stator 2 and/or a portion of the frame 4 placed on the anti-driving side and is amplified, the rectifier 6 is hardly influenced at all by the amplified vibration. Accordingly, vibration received in the rectifier 6 can be reduced, so that the rectifier 6 hardly ever malfunctions.

Still further, when the fin 68 of the rectifier 6 is attached to the frame 4 having concave and convex portions on its outer surface by fastening the screws 72 inserted into the holes 69 to the frame 4, excessive stress is generated in the fin 68 deformed along the concave and convex portions of the frame 4. However, because the thin-walled portions of the fin 68 formed on the separation grooves 68C make the fin 68 smoothly bendable, the stress on the fin 68 can be relieved by the thin-walled portions. Accordingly, the occurrence of distortion or breakage in the fin 68 can be prevented. Further, even though water enters into an open space near the fin 68, the water can be discharged outside the alternator 1 through the separation grooves 68C of the fin 68. Accordingly, the occurrence of erosion caused by water held in the rectifier 6 can be suppressed.

Still further, the rectifying elements 65 forcibly inserted into the attaching holes of the fin 68 are fixedly fitted to the fin 68. Because the thin-walled portions of the fin 68 prevent the fin 68 from being distorted, the fitting strength of the elements 65 to the fin 68 can be maintained regardless of a change in operation circumferences of the alternator 1. Further, because the elements 65 are fixedly fitted to the fin 68 without using a complicated assembling work such as soldering, the alternator 1 can be manufactured at a low cost.

Still further, the attaching holes of the fin 67 are disposed at almost equal intervals along a circumferential direction of the fin 67. Therefore, the fin 67 can almost equally dissipate heat generated in the rectifying elements 63, so that the elements 63 can be almost equally cooled. Accordingly, the fin 67 can improve its cooling performance, and a designer can easily design the fin 67 while considering an expected life and cooling performance of the fin 67.

Still further, the fin portions 68A and 68B of the fin 68 are equally partitioned by the thin-walled portions such that the holes of the fin portion 68A are placed symmetrically with the holes of the fin portion 68B with respect to a line passing through the thin-walled portions. Therefore, an area of the fin portion 68A becomes almost the same as that of the fin portion 68B. Therefore, the group of three rectifying elements 65 of the fin portion 68A and the group of three rectifying elements 65 of the fin portion 68B can be almost equally cooled. Accordingly, the fin 68 can improve its cooling performance, and a designer can easily design the fin 68 while considering an expected life and cooling performance of the fin 68.

Still further, the rectifier 6 has the fins 67 and 68 for holding the rectifying elements 63 and 65. Accordingly, the rectifier 6 can be easily fixed to the frame 4 by fixing the fins 67 and 68 to the frame 4. Further, the rectifier 6 has the terminal board 61 for connecting the rectifying elements 63 with the rectifying elements 65. Accordingly, the rectifying elements 63 can be easily connected with the rectifying elements 65.

Still further, each rectifying element of the rectifier 6 is made of a diode which generates heat larger than that generated in a metal oxide semiconductor field effect transistor (MOSFET), so that heat generated in the rectifier 6 becomes large. However, because the regulator 7 and rectifier 6 are disposed away from each other with the rotor 3 between, the regulator 7 hardly receives heat generated in the rectifier 6. Accordingly, a temperature rise of the regulator 7 caused by the rectifier 6 made of diodes can be suppressed.

Still further, an inner diameter (i.e., diameter of center hole) of the fins 67 and 68 is larger than an outer diameter of the pulley shaft 8A protruded toward the rotor 3, so that the position of the rectifier 6 can be designed to be the same as that of the pulley shaft 8A in the axial direction while being differentiated from that of the pulley shaft 8A in the radial direction. Accordingly, the structural design for the alternator 1 can be simplified, and the increase of the size of the alternator 1 in the axial direction can be suppressed.

Still further, the fin 67 has the B-bar 671 acting as a connection bar, and the cross-over line of the B-bar 671 extends from the driving side to the anti-driving side along the axial direction and is fitted to the B-bolt 60 denoting an output terminal of the rectifier 6. Therefore, although the rectifier 6 is disposed far away from an output cable of the vehicle normally disposed on the rear side, an electrical energy generated in the alternator 1 can be output from the rectifier 6 to current consumers and battery through the output cable of the vehicle connected with the B-bolt 60 without changing the position of the output cable.

Still further, although the rectifier 6 is disposed on the driving side, the regulator 7 disposed on the ant-driving side can easily be connected with the rectifier 6 through the B-bolt 60 to receive a field current from the rectifier 6. Accordingly, the rectifier 6 disposed on the driving side can suppress the increase of a manufacturing cost of the alternator 1.

Still further, because the cross-over line of the B-bar 671 is covered with an insulating material, the B-bar 671 can be electrically insulated from the frame 4 and component parts disposed in an engine room. Accordingly, the structural design of the alternator 1 can easily be made. The B-bar 671 may have a fixing member fixed to the frame 4. In this case, even though the B-bar 671 receives a vibration force from the rectifying elements 63 during the operation of the alternator 1, the fixing member can prevent the B-bar 671 from being vibrated. Further, the B-bar 671 is integrally formed with the fin 67 or is fitted to the fin 67. Accordingly, the rectifier 6 disposed on the driving side can suppress the increase of a manufacturing cost of the alternator 1.

Still further, the fin 67 may have a P-terminal to be connected with a P-terminal of the regulator 7. In this case, the P-terminal of the fin 67 may extend in parallel to the B-bar 671. Accordingly, the regulator 7 can easily be connected with the rectifier 6, and the increase in a manufacturing cost of the alternator 1 can be suppressed.

Still further, a level of heat generated in the diodes of the rectifier 6 is proportional to a value of the electric current flowing through the rectifier 6. Further, when a certain electric power is charged from the alternator 1 to a battery and electric consumers, a value of the electric current flowing through the rectifier 6 is increased as the voltage of the electric current is decreased. Therefore, as a rated output voltage of the battery is decreased, the voltage of the electric current flowing through the rectifier 6 is decreased, and heat generated in the rectifier 6 is increased. Generally, a battery having a rated output voltage set at 48V, a battery having a rated output voltage set at 24V, and a battery having a rated output voltage set at 12V are often used. Accordingly, when a battery having a rated output voltage set at 12V is used in the vehicle, an effect on the reduction of the temperature rise in the regulator 7 can be maximized.

In this embodiment, the rectifying elements 63 held by the fin 67 are symmetrical with respect to the center of the fin 67, and a group of the three rectifying elements 65 and another group of the three rectifying elements 65 are symmetrical with respect to the thin-walled portions 68C. However, the rectifying elements 65 may be set to be symmetrical with respect to the center of the fin 68.

Embodiment 2

Figure 7:
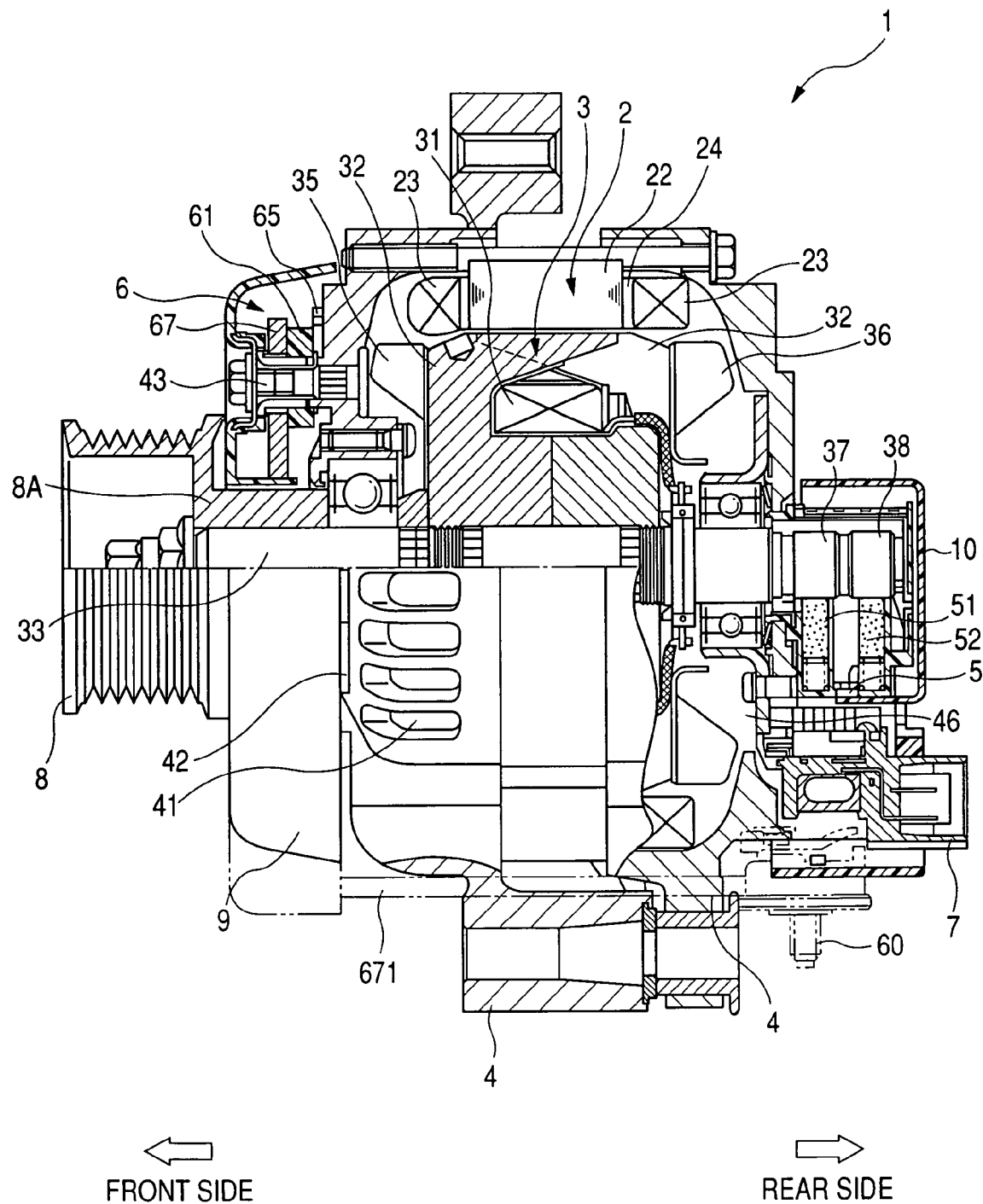
FIG. 7 is a longitudinal sectional view of an alternator according to a second embodiment of the present invention.

FIG. 7 is a longitudinal sectional view of an alternator according to a second embodiment. In this embodiment, the rectifier 6 has no second radiation fin, but the rectifying elements 65 of the rectifier 6 are directly fixed to a front portion of the frame 4 disposed on the driving side. More specifically, six concavities or through holes are formed in the front portion of the frame 4, and the elements 65 are forcibly inserted into the concavities or holes of the frame 4, respectively. Therefore, the elements 65 are fitted to the frame 4 and are earthed through the frame 4.

With this structure of the alternator 1, in addition to the effects described in the first embodiment, the front portion of the frame 4 having an area larger than that of the fin 68 can act as a radiation fin having a thermal capacity larger than that of the fin 68. Accordingly, a temperature rise of the rectifying elements 65 can be further suppressed.

Further, because the fin 68 or the fixing members for fixing the fin 68 to the frame 4 are not required, the number of component parts in the alternator 1 can be reduced, and the alternator 1 is manufactured at a lower cost.

Embodiment 3

An exhaust manifold of an internal combustion engine is normally disposed near the rear side of the alternator 1. Therefore, when the regulator 7 is disposed on the anti-driving side of the rotor 3, the regulator 7 receives heat from the manifold heated at a high temperature. Therefore, there is a possibility that the regulator 7 malfunction due to heat received from the manifold.

Figure 8:
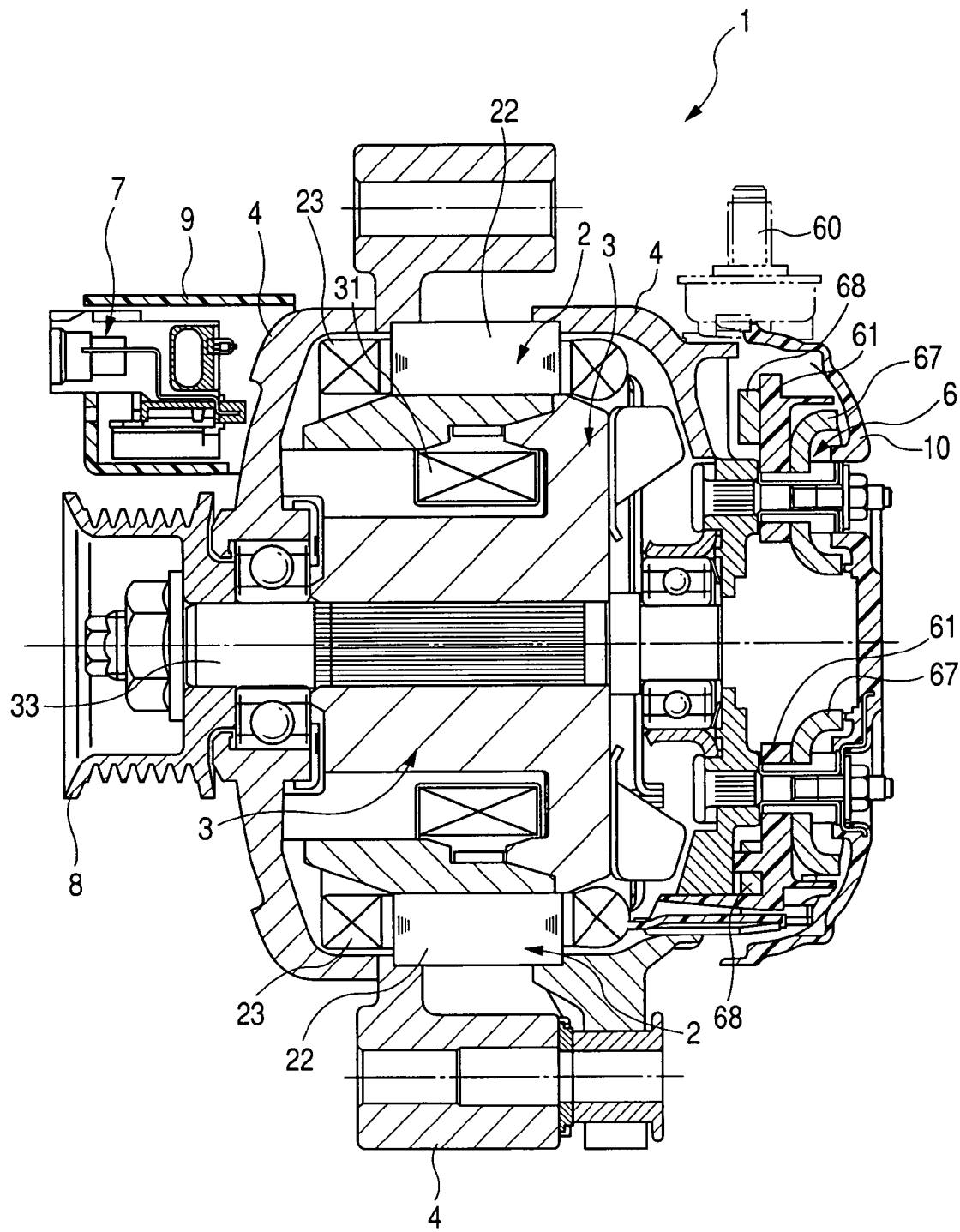
FIG. 8 is a longitudinal sectional view of an alternator having a brushless structure according to a third embodiment of the present invention.

FIG. 8 is a longitudinal sectional view of an alternator having a brushless structure according to a third embodiment. In this embodiment, the rectifier 6 is disposed on the anti-driving side of the rotor 3, and the regulator 7 is disposed on the driving side of the rotor 3. No brush device is disposed on the alternator 1.

With this structure, a distance between the regulator 7 and the exhaust manifold of the engine becomes large as compared with that according to the first embodiment. Accordingly, heat transmitted from the manifold to the regulator 7 can be reduced, so that a temperature rise of the regulator 7 can be further reduced.

Further, because no brush device is disposed on the rear side, the rectifier 6 can occupy the whole space on the anti-driving side of the rotor 3. Therefore, the fins 67 and 68 of the rectifier 6 can be formed together in a large size. Accordingly, a temperature rise of the rectifier 6 can be efficiently reduced, so that the rectifier 6 can be reliably operated for a long time. Further, because no space for a brush device is required, the alternator 1 can be manufactured in a smaller size.

In this embodiment, no brush device is disposed in the alternator. However, the brush device 5 may be disposed with the regulator 7 on the driving side of the rotor 3 by fixing the device 5 to the front portion of the frame 4. With this structure of the alternator, the effects in the first embodiment can be obtained in the same manner.

What is claimed is:

1. An alternator comprising:
    a rotor with a field wiring receiving a field current;
    a stator with a multi-phase stator wiring, an alternating current being generated in the stator wiring in response to a rotation of the rotor and the field current received in the field wiring;
    a single rectifier that converts the alternating current of the stator wiring into a direct current and outputs the direct current as an electrical energy generated in the alternator; and
    a single regulator that regulates the field current to control the electrical energy,
    wherein the regulator and the rectifier are disposed away from each other with the rotor between, and
        wherein the rotor receives a rotational force on a driving side thereof, the rectifier is disposed only on the driving side of the rotor, and the regulator is disposed only on an anti-driving side of the rotor opposite to the driving side.

2. The alternator according to claim 1, further comprising:
    a frame that holds the rotor and the stator,
    wherein the rectifier has a plurality of first rectifying elements, a first radiation fin to which the first rectifying elements are attached so as to electrically connect the first rectifying elements with a high voltage terminal through the first radiation fin, a plurality of second rectifying elements, a second radiation fin to which the second rectifying elements are attached so as to electrically connect the second rectifying elements with a low voltage terminal through the second radiation fin, a fixing member fixing the second radiation fin to the frame, and a terminal board holding a plurality of connection terminals which receive the alternating current from the stator and serially connect the first rectifying elements and the second rectifying elements, respectively.

3. The alternator according to claim 2, further comprising:
a pulley, with a pulley shaft attached to the rotor, that transmits a rotational force from an engine to the rotor, wherein the first radiation fin has an inner hole larger than an outer diameter of the pulley shaft so as to receive the pulley shaft into the inner hole of the first radiation fin.

4. The alternator according to claim 2, wherein the rectifier has an output terminal disposed on the anti-driving side of the rotor, and a bar connecting the first radiation fin with the output terminal to output the direct current from the output terminal.

5. The alternator according to claim 2, wherein at least one of the fins of the rectifier is formed in a disk shape extending on a plane perpendicular to an axial direction of the rotor, and the corresponding rectifying elements are disposed along a circumferential direction of the fin.

6. The alternator according to claim 2, wherein the second radiation fin has a thin-walled portion, a first partitioned fin portion and a second partitioned fin portion, shapes of the partitioned fin portions are set to be symmetrical with respect to the thin-walled portion, and a group of the second rectifying elements disposed on the first partitioned fin portion and a group of the second rectifying elements disposed on the second partitioned fin portion are set to be symmetrical with respect to the thin-walled portion.

7. The alternator according to claim 2, wherein the first rectifying elements or the second rectifying elements are set to be symmetrical with respect to a center of the corresponding radiation fin.

8. The alternator as described in claim 1, further comprising:
a frame that holds the rotor and the stator,
wherein the rectifier has a plurality of first rectifying elements, a radiation fin to which the first rectifying elements are attached so as to electrically connect the first rectifying elements with a high voltage terminal through the radiation fin, a plurality of second rectifying elements fixed to the frame so as to electrically connect the second rectifying elements with a low voltage terminal through the frame, and a terminal board holding a plurality of connection terminals which receive the alternating current from the stator and serially connect the first rectifying elements and the second rectifying elements, respectively.

9. The alternator according to claim 8, further comprising:
a pulley, with a pulley shaft attached to the rotor, that transmits a rotational force from an engine to the rotor, wherein the radiation fin has an inner hole larger than an outer diameter of the pulley shaft so as to receive the pulley shaft into the inner hole of the radiation fin.

10. The alternator according to claim 8, wherein the rectifier has an output terminal disposed on the anti-driving side of the rotor, and a bar connecting the radiation fin with the output terminal to output the direct current from the output terminal.

11. The alternator according to claim 8, wherein the radiation fin of the rectifier is formed in a disk shape extending on a plane perpendicular to an axial direction of the rotor, and the first rectifying elements are disposed along a circumferential direction of the radiation fin.

12. The alternator according to claim 8, wherein the first rectifying elements are set to be symmetrical with respect to a center of the radiation fin.

13. The alternator according to claim 1, wherein the rotor receives a rotational force on a driving side thereof, the regulator is disposed on the driving side of the rotor, and the rectifier is disposed on an anti-driving side of the rotor opposite to the driving side.

14. The alternator according to claim 13, further comprising:
a frame that holds the rotor and the stator,
wherein the rectifier has a plurality of first rectifying elements, a first radiation fin to which the first rectifying elements are attached so as to electrically connect the first rectifying elements with a high voltage terminal through the first radiation fin, a plurality of second rectifying elements, a second radiation fin to which the second rectifying elements are attached so as to electrically connect the second rectifying elements with a low voltage terminal through the second radiation fin, a fixing member fixing the second radiation fin to the frame, and a terminal board holding a plurality of connection terminals which receive the alternating current from the stator and serially connect the first rectifying elements and the second rectifying elements, respectively.

15. The alternator according to claim 13, further comprising:
a frame that holds the rotor and the stator,
wherein the rectifier has a plurality of first rectifying elements, a radiation fin to which the first rectifying elements are attached so as to electrically connect the first rectifying elements with a high voltage terminal through the radiation fin, a plurality of second rectifying elements fixed to the frame so as to electrically connect the second rectifying elements with a low voltage terminal through the frame, and a terminal board holding a plurality of connection terminals which receive the alternating current from the stator and serially connect the first rectifying elements and the second rectifying elements, respectively.

16. The alternator according to claim 13, further comprising a brush device disposed on the driving side of the rotor, the filed current regulated by the regulator being transmitted to the rotor through the brush device.

17. The alternator according to claim 1, wherein the rectifier has a plurality of first diodes and a plurality of second diodes, cathodes of the first diodes are connected with a high voltage terminal, anodes of the second diodes are connected with a low voltage terminal, anodes of the first diodes, are serially connected with cathodes of the second diodes at connection points, respectively, and the alternating current of the stator being received at the connection points.

18. The alternator according to claim 1, wherein the rectifier is connected with a battery of which a rated output voltage is set at 12V.

* * * * *